(12) United States Patent
Luburic

(10) Patent No.: US 8,322,112 B2
(45) Date of Patent: Dec. 4, 2012

(54) NESTABLE STRUCTURAL HOLLOW BODY AND RELATED METHODS

(75) Inventor: Frano Luburic, Anaheim Hills, CA (US)

(73) Assignee: Ropak Corporation, Fountain Valley, CA (US)

( * ) Notice: Subject to any disclaimer, the term of this patent is extended or adjusted under 35 U.S.C. 154(b) by 0 days.

(21) Appl. No.: 12/656,418

(22) Filed: Jan. 28, 2010

(65) Prior Publication Data

US 2010/0132290 A1  Jun. 3, 2010

Related U.S. Application Data

(62) Division of application No. 11/364,288, filed on Feb. 28, 2006.

(51) Int. Cl.
| | |
|---|---|
| *E04B 1/00* | (2006.01) |
| *E04B 5/00* | (2006.01) |
| *E04G 21/00* | (2006.01) |
| *E04C 3/30* | (2006.01) |
| *E04C 3/00* | (2006.01) |
| *B28B 7/28* | (2006.01) |

(52) U.S. Cl. ........... 52/745.13; 52/323; 52/380; 52/576; 52/577; 249/185

(58) Field of Classification Search ............ 52/576, 52/577, 323, 649.1, 677, 320, 380, 745.13; 249/176, 184, 185; 264/271.1
See application file for complete search history.

(56) References Cited

U.S. PATENT DOCUMENTS

| 1,085,862 | A | * | 2/1914 | Herzberg | 52/577 |
| 2,792,164 | A | * | 5/1957 | Cauffiel | 182/194 |
| 3,043,354 | A | * | 7/1962 | Fitzgerald | 220/4.23 |
| 3,543,458 | A | * | 12/1970 | Guritz | 52/127.3 |
| 4,060,954 | A | * | 12/1977 | Liuzza | 52/677 |
| 5,072,911 | A | * | 12/1991 | Logsdon | 249/61 |
| 5,396,747 | A | * | 3/1995 | Breuning | 52/516 |
| 5,797,230 | A | * | 8/1998 | Lassen | 52/323 |
| 5,893,252 | A | * | 4/1999 | Hardy et al. | 52/685 |
| 6,050,438 | A | * | 4/2000 | Kovens et al. | 220/4.24 |

(Continued)

FOREIGN PATENT DOCUMENTS

DE  2116479  12/1971

OTHER PUBLICATIONS

Bubbledeck Flyer, http://www.bbdna.com/about.htm, Feb. 28, 2006.

*Primary Examiner* — Joshua J Michener
*Assistant Examiner* — Andrew Triggs
(74) *Attorney, Agent, or Firm* — Vedder Price P.C.

(57) ABSTRACT

A multi-piece interconnected body for use in at least structural support and/or in creating internal cavities for an improved strength-to-weight ratio in a variety of structures is nestable prior to its assembly and use. When assembled, the device preferably forms a generally spherical and hollow body, with (1) one or more ribs or similar structural support network associated with and/or integrally formed in the body; (2) at least one latch mechanism to help hold the pieces in a desired assembled relationship with each other; and (3) a hinge or other interconnecting element that facilitates nesting and/or stacking of a plurality of the bodies with each other prior to assembly, association of the multiple parts of each body with each other prior to assembly, and ready repositioning of those parts into a desired assembled position.

8 Claims, 8 Drawing Sheets

U.S. PATENT DOCUMENTS

| | | |
|---|---|---|
| 6,325,211 B1 | 12/2001 | Greiner |
| 6,840,018 B2 * | 1/2005 | Takagi .................... 52/600 |
| 7,451,580 B2 * | 11/2008 | Kelly et al. ............... 52/687 |
| 7,540,121 B2 * | 6/2009 | Haeussler ................. 52/323 |
| 7,685,789 B2 * | 3/2010 | Houben .................... 52/576 |
| D639,449 S * | 6/2011 | Luburic ..................... D25/1 |
| 2005/0284071 A1 * | 12/2005 | Houben .................... 52/576 |
| 2007/0214740 A1 * | 9/2007 | O'Grady ................... 52/577 |

* cited by examiner

NESTABLE STRUCTURAL HOLLOW BODY AND RELATED METHODS

This application is a divisional of U.S. patent application Ser. No. 11/364,288 filed Feb. 28, 2006 which is hereby incorporated by reference for all purposes as if fully set forth herein.

FIELD OF THE INVENTION

The invention relates generally to structural components and related methods, and more specifically to a nestable spherical hollow body that is convenient to use and assemble at least for structural support and/or creating internal cavities in concrete or similar applications.

BACKGROUND OF THE INVENTION

Many concrete or similar structural components conventionally are relatively thick and heavy, compared to their weight bearing capacity. The formation of voids within concrete can improve the economics, performance, and versatility of the concrete and its implementation.

Prestressed, prefabricated concrete elements with extended cross sections and internal hollow cylindrical cavities have been used to reduce the weight "problems", but they typically only span in a "single" direction. In other words, they are typically relatively long and narrow concrete beams with one or more web elements extending significantly below the concrete "deck." Alternative approaches have included placing lightweight balls within the concrete as it is poured (for example, see DE 2,116,479) or similarly positioning hollow spheres within a mesh assembly in the concrete (for example, see U.S. Pat. No. 5,396,747, issued to Breuning in 1995).

A system using embedded blow-molded plastic balls is described at the website of BubbleDeck North America Ltd. BubbleDeck currently produces a pre-fabricated solid concrete slab structure having plastic balls embedded in concrete, to reduce the slab's weight. According to BubbleDeck, the pre-fabricated concrete slab can reduce construction material weight by up to fifty percent (50%). The BubbleDeck plastic balls are hollow, spherical shapes (similar to ping pong balls), and are of a solid fixed single piece construction. That single piece hollow body construction apparently has a generally uniform wall thickness sufficient to withstand the stress imposed by the surrounding concrete material, but that solid fixed single piece construction limits at least the shipping and handling characteristics of the inserts (balls) prior to use, and can also affect the stress handling capacity of the plastic balls.

Thus, the weight advantages of systems such as the BubbleDeck balls are compromised by certain disadvantages inherent in their design. Among other things, because they are blow-molded spheres, they are cannot be efficiently stored or transported prior to their use on a jobsite.

SUMMARY OF THE INVENTION

The invention is directed to a nestable hollow body that, among other things, is useful for at least structural support and/or creating internal cavities for an improved strength-to-weight ratio in a variety of concrete or other structures. Rather than a series of loose components separate from each other (see, for example, FIGS. 3-5 of the aforementioned '747 patent), the present invention preferably provides a single connected element whose parts can be easily moved (via hinges or otherwise) from an "open" or nestable position into a "closed" or assembled position. The invention provides for, among other things, nestabilty in a hollow body, and provides for space saving and efficient methods of manufacturing, handling, storing, transporting, and/or assembling the hollow bodies. The invention further facilitates additional structural support within the hollow body itself, to increase the load bearing capacity of the hollow body when subjected to external forces such as those commonly imposed on it by concrete or when otherwise used for its intended purposes.

In one embodiment, the device is preferably a multi-section hollow body having: (1) a structural support network disposed within or formed in its interior; (2) a hinge mechanism to keep the sections connected to each other prior to assembly and to permit repositioning (or "closing") of the sections into a final desired configuration prior to their use; and (3) at least one latch mechanism to help hold the sections in that final desired configuration prior to their use. For embodiments having two sections formed of plastic via injection molding, an integral hinge preferably permits a top or first section of the hollow body and a bottom or second section of the hollow body to be (1) fabricated in an opened or an extended state (which permits stacking or nesting of a plurality of hollow bodies on top of each other prior to their eventual use), and then (2) moved to a closed or an assembled state to permit use of the hollow body for its intended purposes.

Methods of fabrication, transportation, and use related to the aforementioned apparatus are also described herein. Among other things, such methods improve the efficiency of storage and transport and assembly of the void-making devices prior to their use in a concrete or similar construction application.

Certain objects and advantages have been and are further described herein. Persons of ordinary skill in the art will understand that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

These and other embodiments will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

FIG. 4(*b*) is a sectional view of the stacked and nested bodies of FIG. 4(*a*), with the section being taken along the widest portion of the bodies and generally parallel to the plane of the paper on which FIG. 4(*a*) is shown.

FIG. 7(*b*) is similar to FIG. 7(*a*), but shows a partially sectional perspective view of the latch mechanism, with the section taken in a generally vertical plane through FIG. 7(*a*).

DETAILED DESCRIPTION

Figure 1:
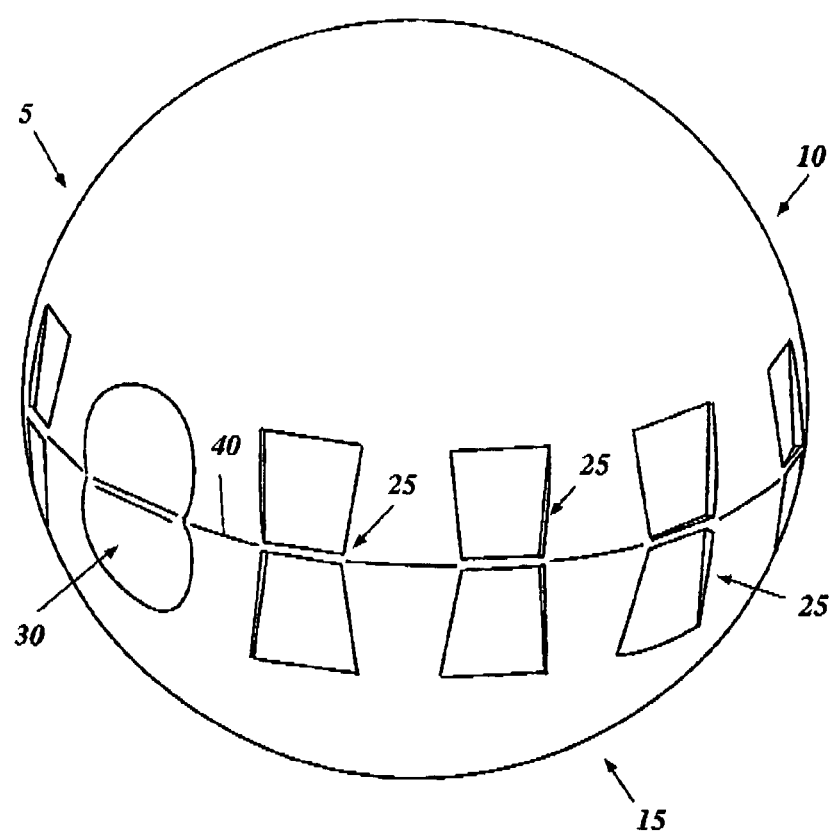
FIG. 1 is a perspective view showing a multi-portion hollow body in a closed or assembled state, in accordance with one embodiment of the present invention.

Embodiments of the present invention will now be described with references to the accompanying Figures, wherein like reference numerals refer to like elements throughout. The terminology used in the description presented herein is not intended to be interpreted in any limited or restrictive manner, simply because it is being utilized in conjunction with a detailed description of certain embodiments of the invention. Furthermore, various embodiments of the invention (whether or not specifically described herein) may include novel features, no single one of which is solely responsible for its desirable attributes or which is essential to practicing the invention herein described.

Persons of ordinary skill in the art will understand that the invention can be practiced using any of a wide variety of suitable processes and materials. By way of example and not by way of limitation, fabrication processes include die cast, investment casting, sheet metal stamping, single/twin sheet thermo-form, blow-molding, rotational molding, injection molding, gas assist, water assist, web molding, structural foam molding, and many other existing and new processes that may come into being. Materials are not limited in anyway and could extend from metals to resins of all types. A preferred material is plastic, and a preferred method of fabrication is by injection molding.

The device described herein may generally be used for at least structural support and/or creating internal cavities for improved strength-to-weight ratio in a variety of structures. In this regard, the structural hollow bodies described herein are typically intended to be embedded in concrete or some other material for the purpose of eliminating the concrete or some other material that has weight but no carrying effect. Persons of ordinary skill in the art will understand that although the aforementioned application may be a preferred use, the structural hollow bodies described herein may be used in any number of other applications.

As shown in FIGS. 1-4, in one embodiment, the device is preferably a hollow body 5 having: (1) a top/first section 10 and a bottom/second section 15 of substantially the same size and shape; (2) a structural support network 20 disposed within the hollow body 5 to increase the load bearing capacity of the hollow body 5 when subjected to external forces; (3) at least one latch mechanism 25 positioned along the periphery 40 of the hollow body 5; and (4) a corresponding hinge 30 positioned along the periphery 40 of the hollow body 5 so as to permit repositioning of the top section 10 of the hollow body 5 and the bottom section 15 of the hollow body 5 from an opened state, to permit nesting of a plurality of such hollow bodies 5 on top of each other, to a closed state to permit use of the hollow body 5 for its intended purposes. Persons of ordinary skill in the art will understand that the orientation of "top" or "bottom" used herein is for convenience only, and that the specific orientation of the body within a particular application can be any direction.

Figure 2:
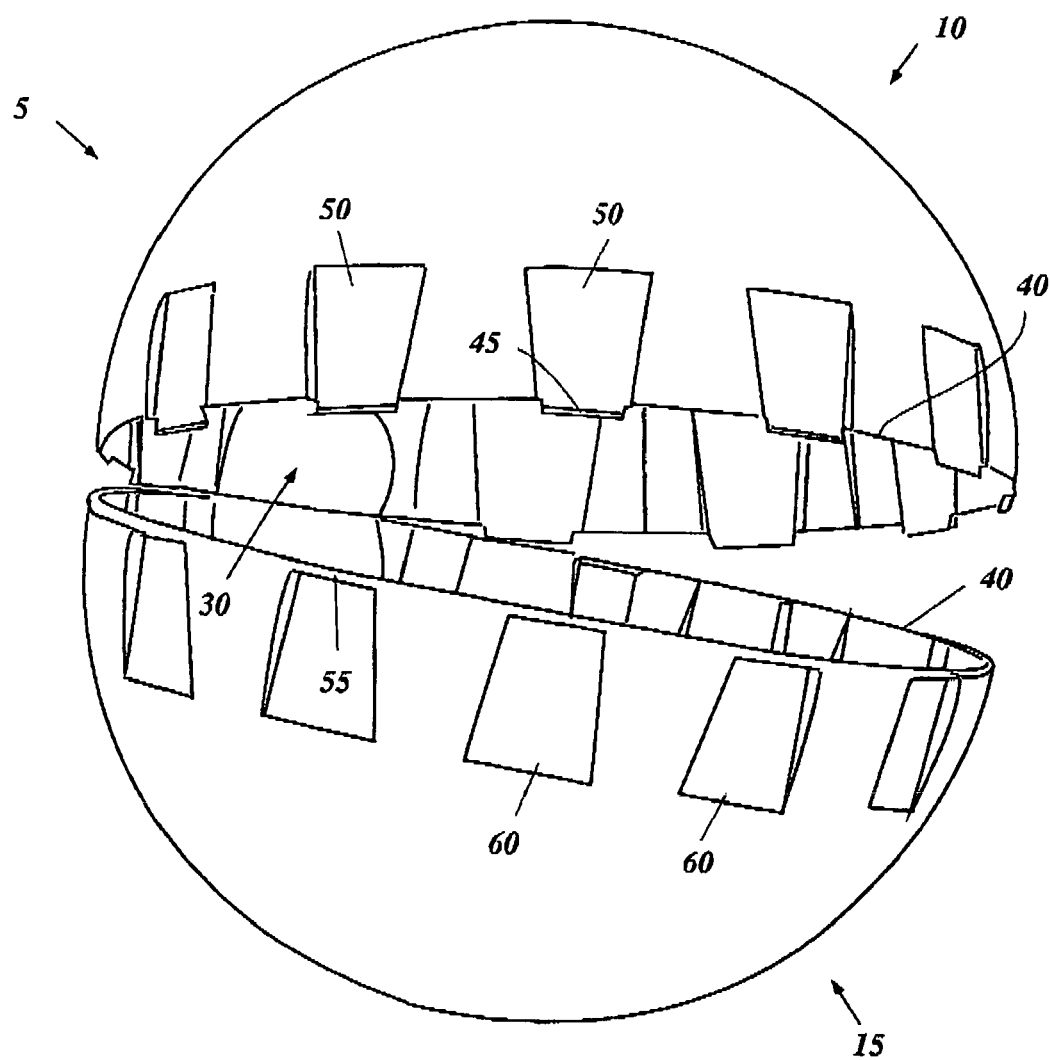
FIG. 2 is similar to FIG. 1, but shows the hollow body in a slightly open position.
Figure 3:
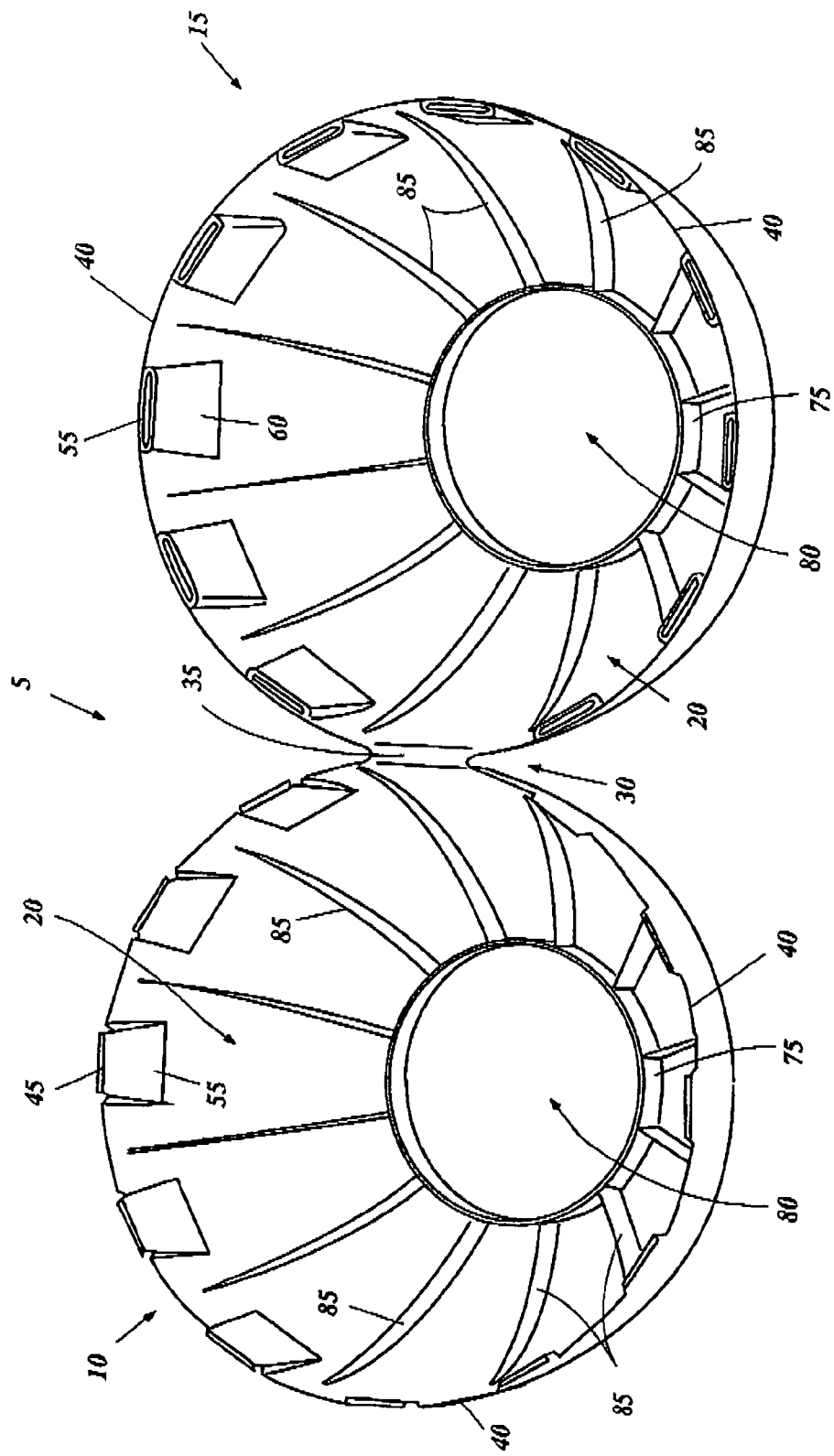
FIG. 3 is a perspective view looking down into the interior of the body of FIG. 2 after it has been further opened, and illustrates an embodiment of a structural support network disposed within each of the sections of the body.

As shown in FIGS. 1-3, top section 10 and bottom section 15 are secured to each other along the periphery 40 of top section 10 and bottom section 15 to form a sidewall of hollow body 5 that encloses an interior of hollow body 5.

The geometric shape of the device 5 described herein is preferably spherical, having a top section 10 and a bottom section 15 of substantially the same size and shape (i.e., half spheres). However, persons of ordinary skill in the art will understand that as long as the general attributes and principles of the device (hollow body) 5 as described herein are utilized, the device 5 can be of virtually any size and shape. Such shapes may include a square, triangle, hexagon, geodesic dome/sphere, or other shape. In addition, the wall thickness of the hollow body 5 and/or structural support network 20 may vary and will typically depend on the device's intended use or application.

Figure 5:
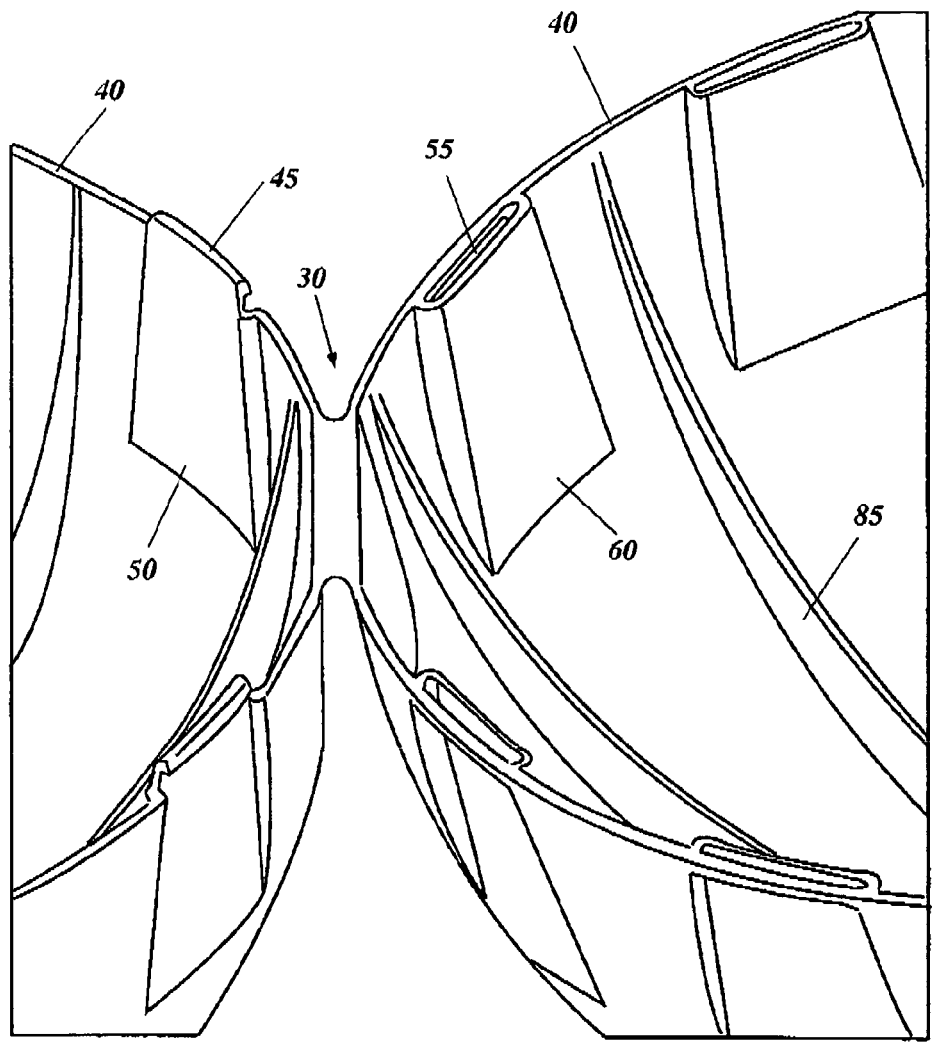
FIG. 5 is similar to FIG. 3, but shows a close-up view of the central interconnecting portion of the body, illustrating one embodiment of a hinge that can be used in the hollow body of FIG. 1.
Figure 6:
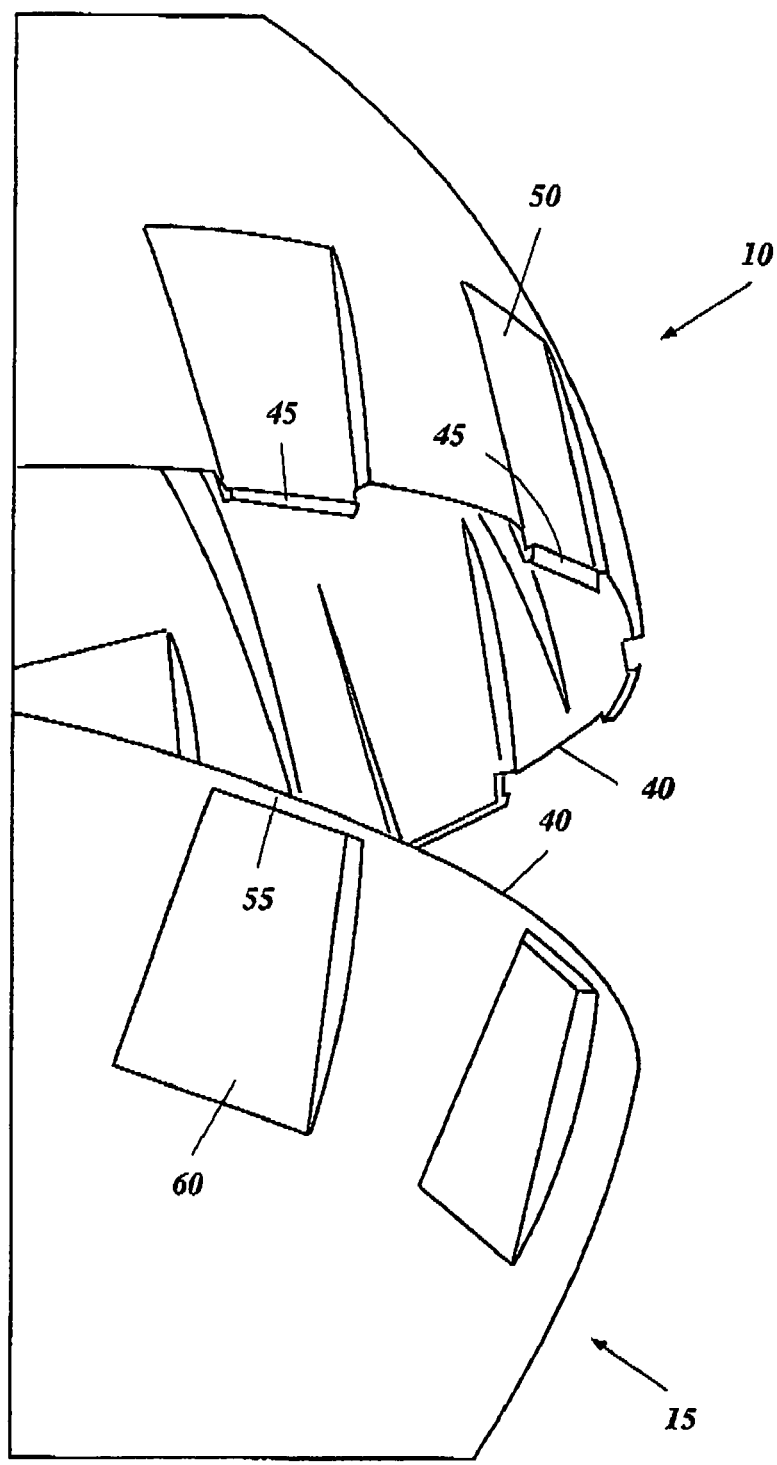
FIG. 6 is similar to FIG. 2, but shows a close-up view of one embodiment of a latch mechanism that can be used in the hollow body of FIG. 1.

As shown in FIG. 5, the preferred hinge 30 (connecting the top section to the bottom section) is formed as part of an area of reduced thickness of plastic 35 along the periphery 40 between the top section 10 and the bottom section 15 of the hollow body 5. For injection molded embodiments, the hinge can be a "living hinge" formed of the same plastic as the rest of the body.

When used for their intended purposes (i.e., for structural support and/or creating internal cavities for improved strength-to-weight ratio in a variety of structures), the hollow bodies 5 preferably are in a closed or assembled state, as shown in FIG. 1. No further repositioning of the top section 10 of the hollow body 5 relative to the bottom section 15 of the hollow body 5 is needed. While other more durable hinge types may be utilized, the hinge 30 is intended for a single use application so its durability is relatively less important than its lightweight and cost effective production.

Figure 4:
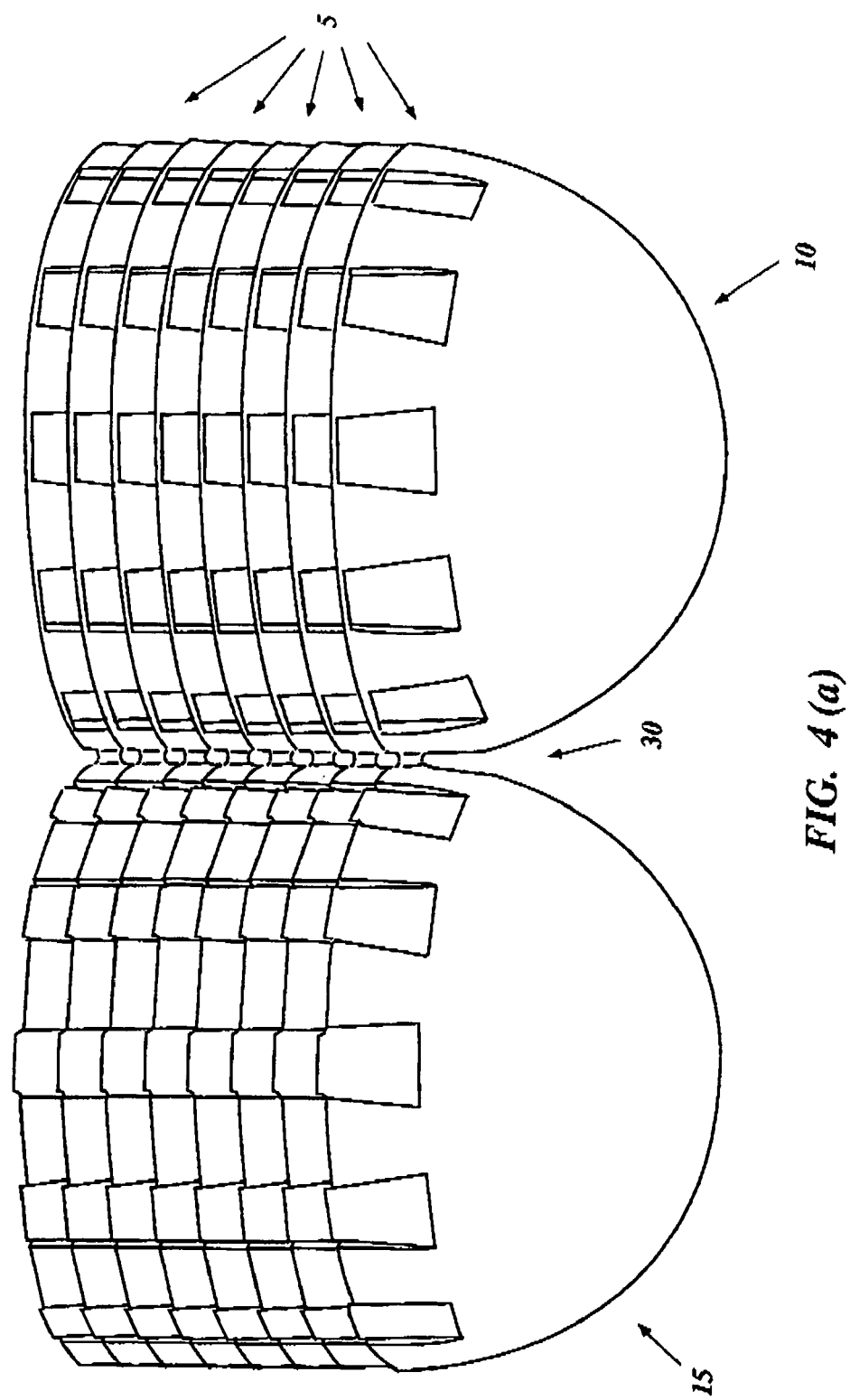
FIG. 4(*a*) is a side perspective view of a plurality of the bodies of FIG. 3, inverted and stacked and nested with each other.
Figure 4:
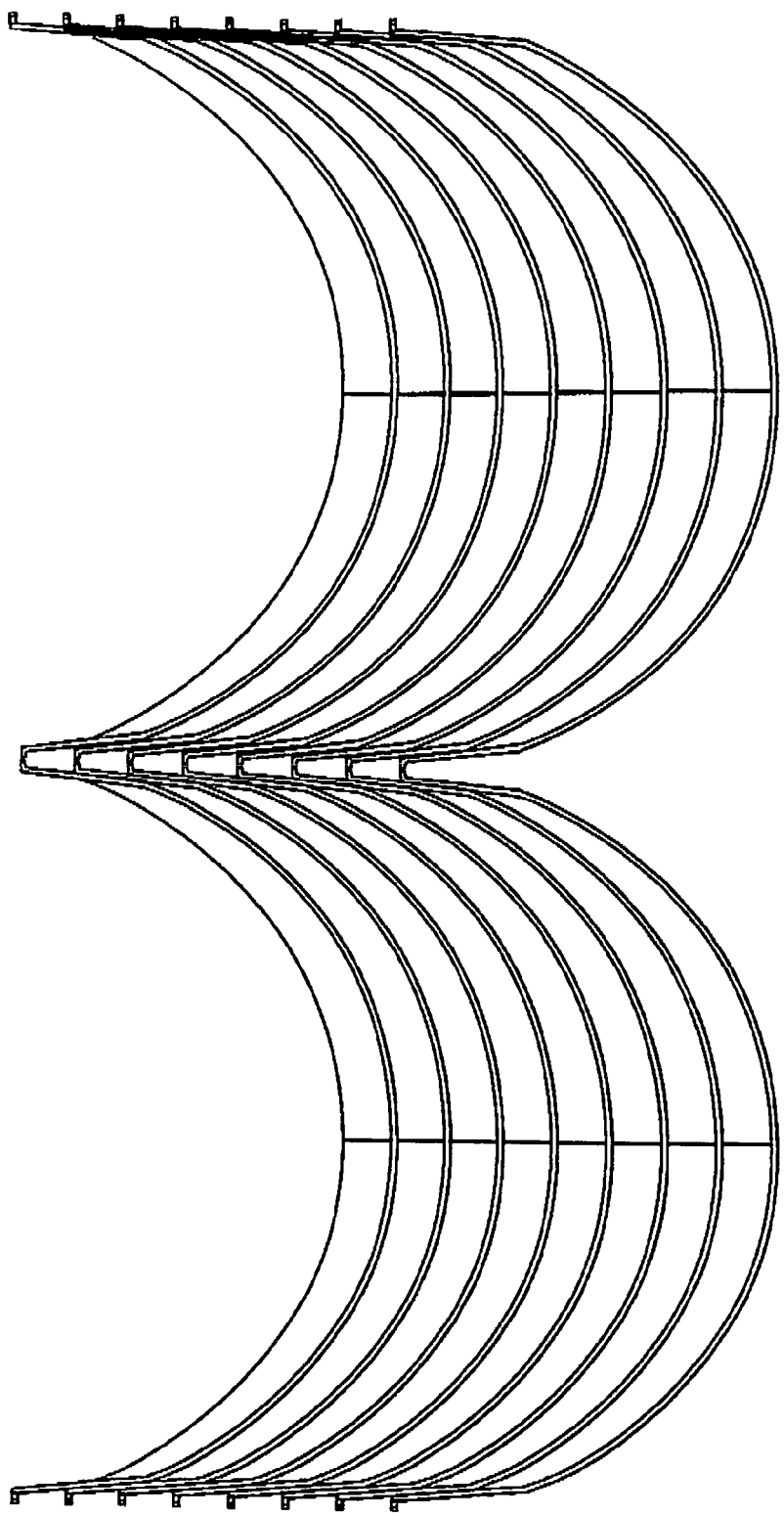

As shown in FIG. 4, the hinge 30 permits the hollow bodies 5 to be shipped or transported from the manufacturer to an end user in an opened or an extended state to facilitate efficient stacking and/or nesting of a plurality of such hollow bodies 5 on top of each other, thereby increasing the number of hollow bodies 5 capable of being contained in a given space (as compared to the number of assembled hollow bodies (or fixed, single piece ping-pong ball type bodies) capable of being contained in the same space).

As shown in FIGS. 2 and 3, the hollow body 5 preferably includes at least one latch mechanism 25, and preferably includes a plurality of such latch mechanisms 25. The latch mechanism 25 preferably includes an enlarged head or male portion 45 formed on the periphery 40 and protruding from a first recessed portion 50 formed on one of the top section 10 or a bottom section 15 of the hollow body 5, and a correspondingly shaped cavity or female portion 55 formed on the periphery 40 as part of a second recessed portion 60 on the other one of the top section 10 or the bottom section 15 of the hollow body 5 for receiving or mating with the head 45 to join, close, or seal the top and bottom sections 10, 15 along the peripheral 40 (mating area between the top section 10 and bottom section 15 of the hollow body) when the hollow body 5 is in the closed or assembled state.

Figure 7:
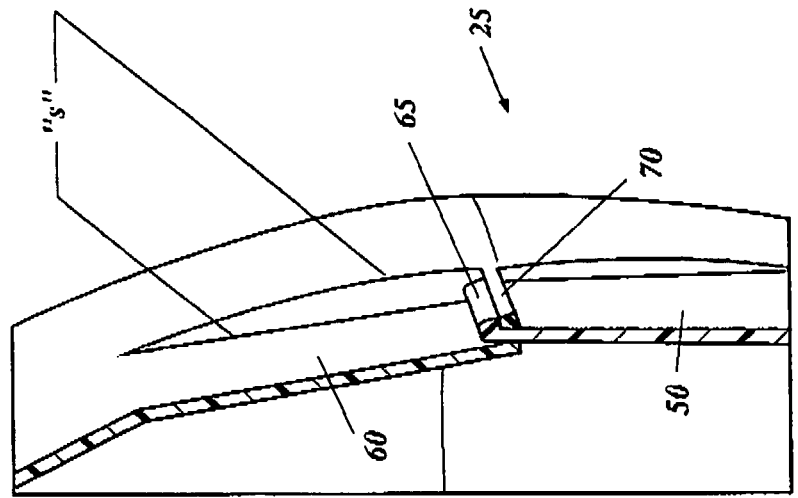
FIG. 7(*a*) is similar to FIG. 6, but shows the latch mechanism in a closed or secured position, such as the position shown in FIG. 1.
Figure 7:
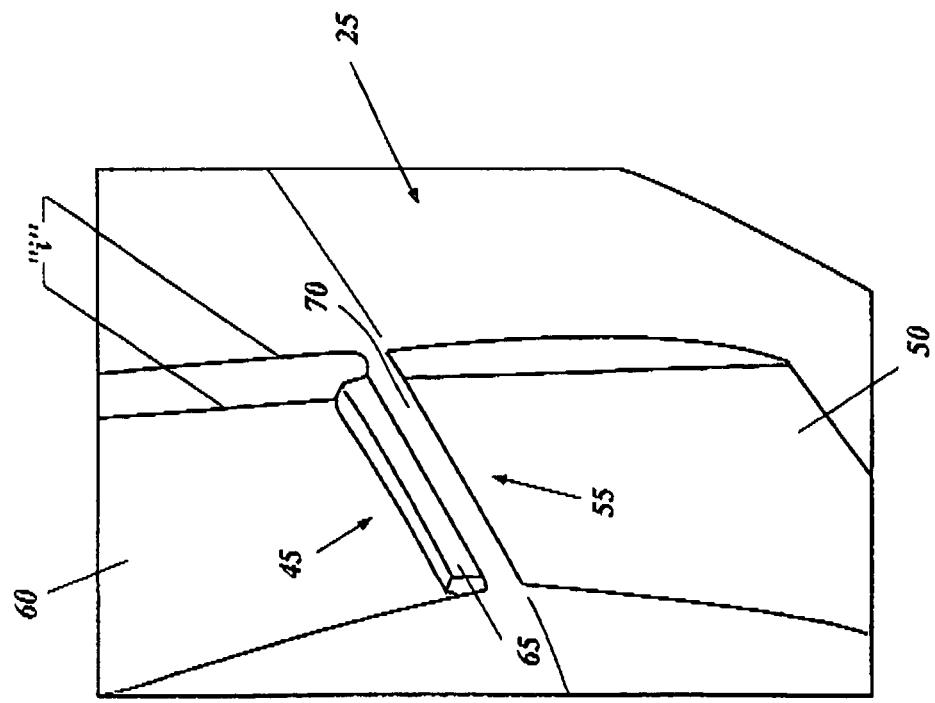

As shown in FIGS. 7(a)-(b), the head 45 preferably is constructed with an enlarged protrusion 65 such that, as the head 45 makes initial contact with the cavity 55, the head 45 moves in a direction away from the periphery 40 of the hollow body 5 so as to be received into the cavity 55. After the head 45 is completely received into the cavity 55, material memory (and/or compressive hoop stress) causes the head 45 to move back out into its original position, securing the protruding portion 65 of the head 45 firmly against a lip 70 of the cavity 55, and securing the top section 10 of the hollow body 5 to the bottom section 15 of the hollow body 5 along the peripheral edges 40.

Similar to the hinge 30, the latch 25 is intended for a single use application. In this regard, once secured in the closed or assembled state the hollow body 5 is ready for its intended use. No further repositioning of the top section 10 of the hollow body 5 relative to the bottom section 15 of the hollow body 5 is needed. A plurality of latch mechanisms 25 are preferably provided and used, to increase the integrity of the hollow body 5 in its closed or "sealed" state (i.e., to maximize accurate engagement and minimize the risk of collapse or deformation of the hollow body 5 due to external stress resulting in partial or total separation of the top section 10 from the bottom section 15, or other "failure" of the body's void-making purpose in certain applications).

In certain applications such as forming voids in concrete, it is unlikely that the assembled ball or body will ever need to be "opened." Accordingly, securing the top section 10 of the hollow body 5 to the bottom section 15 of the hollow body 5 is of primary importance, and the ability to "unsecure" or open the latch mechanism(s) 25 is moot, undesirable, and/or irrelevant.

Persons of ordinary skill in the art will understand that any suitable latch may be utilized within the scope of the invention. In this regard, and by way of example, even if just a single latch element 25 is provided on the hollow body, the sealing or further securing of the top section 10 of the hollow body 5 to the bottom section 15 of the hollow body 5 along the periphery 40 may be further aided or facilitated in any number of ways, including the use of a mating tongue and groove structure and/or gasket member along the periphery 40, for example.

As best shown in FIG. 1, the hinge 30 and latch(es) 25 preferably are constructed such that in the closed or assembled state the hinge 30 and latch(es) 25 do not protrude beyond the designated outside diameter of the hollow body 5. In this regard, as indicated above, each of the hinge 30 and latch(es) 25 are formed on a recessed portion 50, 60 of the top section 10 of the hollow body 5 and the bottom section 15 of the hollow body 5. Accordingly, as shown in FIG. 7(a), each recessed portion 50, 60 is sloped (as indicated by reference "s") such that the hinge 30 and latch(es) 25 formed on the periphery 40 as part of each recess 50, 60 are inset a distance (as indicated by reference "i") from the perimeter 40 of the hollow body 5. Among other things, such an inset "i" configuration of the hinge 30 and latch(es) 25 provides a generally smooth outer periphery 40 or profile of the hollow body 4 for purposes of efficient and stable stacking or nesting of a plurality of such hollow bodies 5 on top of each other in the opened or extended state as shown in FIGS. 4(a)-(b).

As shown in FIG. 3, each of the top section 10 and the bottom section 15 of the hollow body 5 preferably includes a structural support network 20 (or web or rib(s)) formed on or disposed in or operatively affixed to the body section or sections. Among other things, the structural support network 20 can increase the load bearing capacity of the hollow body 5 when subjected to the external forces commonly imposed on it, when used for at least structural support and/or to create internal cavities in a variety of structures. The structural support network 20 disposed within the hollow body 5 may be considered as somewhat of a compromise between a hollow body 5 without such a structural support 20 and a completely solid hollow body. In this regard, the structural support network 20 permits a greater load bearing capacity than a hollow body 5 without such a structural support network 20, but at a reduced weight when compared to a completely solid body.

In one embodiment, the reinforcing ribs or structural support network 20 includes a concentric ring 75 positioned generally near a central or bottom portion 80 of each of the top section 10 and the bottom section 15 of the hollow body 5. In other words, in this embodiment, the concentric ring 75 is distal from the periphery opening 40 of the hollow body 5. Preferably, a plurality of equally spaced (or other pattern of) support arms 85 radiate outward from the concentric ring 75 toward the periphery 40 of each of the top section 10 and the bottom section 15 to add structural stability to the hollow body sidewall.

Persons of ordinary skill in the art will understand that the invention can be practiced in other embodiments without any such ribs or webbing, or with any of a wide variety of patterns, shapes, and sizes of ribs or similar support network. Similarly, persons of ordinary skill in the art will understand that, among other things, the diameter, depth, and/or thickness of the concentric ring 75 as well as the number, spacing, and length of each support arm 85 may vary depending on the hollow body's intended purpose or application. For example, a hollow body structural support network 20 (a concentric ring 75 and one or more of the associated support arms 85) intended to withstand the force imposed on a hollow body 5 buried or encased in concrete may be constructed considerably thicker and/or larger in some aspect as compared to a hollow body structural support network 20 that is intended to be buried or encased in some lighter material.

The apparatus and methods of the present invention have been described with some particularity, but the specific designs, constructions and steps disclosed are not to be taken as delimiting of the invention. Obvious modifications will make themselves apparent to those of ordinary skill in the art, all of which will not depart from the essence of the invention and all such changes and modifications are intended to be encompassed within the appended claims, to the extent permitted by any prior art and applicable law.

What is claimed is:

1. A method of constructing, comprising:
receiving a stack of first sections and a stack of second sections, wherein each of said first sections within the stack of first sections is connected to a respective one of said second sections within the stack of second sections, wherein the first sections and the second sections have substantially the same shape and wherein the first sections and second sections each have a periphery;
assembling each first section to each respective second section into a hollow body; and
embedding the assembled hollow bodies in a setting material;

wherein each hollow body is assembled by securing the first section and the second section to each other along the periphery of the first section and the periphery of the second section, respectively, to thereby form a sidewall that encloses an interior of the hollow body.

2. The method of claim 1, wherein embedding the assembled hollow bodies in a setting material includes:
   positioning the hollow bodies within a space; and
   pouring the setting material into the space around the hollow bodies.

3. The method of claim 1, wherein the hollow bodies are generally spherical.

4. The method of claim 1, wherein the setting material includes concrete.

5. The method of claim 1, wherein each hollow body includes a structural support network to increase the load bearing capacity of the hollow body.

6. The method of claim 1, wherein each hollow body includes at least one latch mechanism positioned along a periphery of the first section and the second section.

7. The method of claim 1, wherein each hollow body includes a hinge connecting the first section with the second section.

8. The method of claim 1, wherein the at least one latch mechanism is positioned within the hollow body.

* * * * *